United States Patent Office 3,580,729
Patented May 25, 1971

3,580,729
PROTEIN-SUPPLEMENTED PEANUT SPREAD
Richard T. Darragh and John A. Succo, Cincinnati, Ohio, assignors to The Procter & Gamble Company, Cincinnati, Ohio
No Drawing. Filed Feb. 4, 1969, Ser. No. 796,584
Int. Cl. H23l 1/38
U.S. Cl. 99—128
7 Claims

ABSTRACT OF THE DISCLOSURE

A peanut spread supplemented with soybean protein and having a peanut butter-like eating quality, color and flavor is prepared by admixing particular amounts of soy flour and liquid vegetable oil with conventional peanut butter ingredients, heat treating the resulting combination by maintaining it at a temperature ranging from about 300° F. to about 500° F. for from about 1 to about 5 minutes, and chilling the heat-treated mixture to a temperature ranging from about 35° to about 85° F., for example in a scraped wall heat exchanger.

BACKGROUND OF THE INVENTION

This invention relates to a novel sandwich spread and to a method for making this spread. More particularly, it relates to a peanut spread prepared by supplementing peanut butter ingredients with non-peanut protein.

Many supplementary materials have been added to peanut butter ingredients to make peanut sandwich spreads. These supplementary materials include dextrose up to about 10% by weight concentration, partially or completely hydrogenated fats up to about 15% by weight concentration, and also combinations of sugar and fat additives. These added materials have served either to make the product less sticky in eating quality or to make the product stable against oil separation, or to make the product more flavorful. Thus, although these additives serve useful purposes, they also reduce the protein nutritive value of the resulting product since they do not contain protein and dilute the protein present in conventional peanut butter.

Melnick in U.S. Pat. 3,216,830 discloses the addition of animal proteins, for example lactalbumin, or nonfat dry milk solids, to peanut butter ingredients to improve the protein nutritive value of a peanut spread. Melnick says that it is essential that animal protein be added rather than vegetable protein. Melnick adds these animal proteins to conventional peanut butter ingredients together with a fat, with the added fat alleged to impart to the resulting spread an eating quality equivalent to conventional peanut butter.

Lilien and Glabe, U.S. Pat. 3,037,865, discloses the addition of defatted wheat germ, a highly proteinaceous vegetable material, to peanut butter to enhance its eating quality and flavor. There is no teaching of adding the wheat germ to the peanut butter along with a fat as Melnick utilizes together with his animal protein additives.

Moreover, Food Industries, April 1946, at page 110 discloses a peanut butter containing 15% soy flour. This peanut butter apparently did not contain fat additives, and the soy flour was added to retard oil separation.

Contrary to Melnick's assertions that the added protein must be of an animal nature, it is an object of the present invention to provide a peanut spread containing added vegetable protein and fat to provide a product that has a peanut butter-like eating quality, color and flavor and a protein nutritional value at least equivalent to that of conventional peanut butter. The peanut spread of this invention differs from the spreads described in the Lilien et al. patent and in the Foods Industries article in that fat is added to impart good eating quality to the ultimate peanut spread, and the mixture of ingredients is subjected to special processing to impart color and flavor to the ultimate peanut spread.

SUMMARY OF THE INVENTION

It has been discovered that the above objective can be accomplished, that is, that the protein supplemented peanut spread of this invention can be prepared by a process comprising the steps of: (1) forming a homogeneous mixture by admixing spread ingredients comprising conventional peanut butter ingredients, soy flour, and a liquid vegetable oil in particular proportions; (2) heat treating the homogeneous mixture under particular conditions; and (3) chilling the heat-treated mixture with agitation.

DETAILED DESCRIPTION OF THE INVENTION

Turning first of all to the ingredients utilized in the homogeneous mixture-forming step, the homogeneous mixture, that is, the spread ingredients, necessarily comprise by weight from about 40% to about 50% peanut paste, from about 0.5% to about 5% solid fat stabilizer materials, from about 15% to about 25% soy flour, and from about 25% to about 35% liquid vegetable oil. Preferably, the homogeneous mixture comprises by weight from about 42% to about 48% peanut paste, from about 1% to about 4% solid fat stabilizer materials, from about 17% to about 22% soy flour, and from about 27% to about 32% liquid vegetable oil. The combination of peanut paste and soy flour should amount to at least about 63% by weight of the homogeneous mixture. The peanut paste and the solid fat stabilizer materials are conventional peanut butter ingredients. The soy flour and liquid vegetable oil ingredients are special additives which are a key to providing the benefits of the present invention. In addition to these various ingredients which are required, certain optional ingredients which are sometimes added to conventional peanut butters can also be utilized herein; these normally amount to less than about 5% by weight of the total ingredients utilized herein and are described in detail hereinafter.

The peanut paste ingredient is conveniently obtained by conventional methods by roasting and blanching raw peanuts and then grinding them. The resulting peanut paste is a mixture of peanut particles and oil which has been released from the cellular structure of the nuts during the grinding operation. If this product is allowed to stand for a period of time, the oil will separate from the product and will form a separate layer on top and a rigid crumbly mass underneath.

The solid fat stabiilzer materials are utilized so that layer separation in the peanut paste will not occur. In other words, it stabilizes the peanut paste against separation of oil and solid components. The solid fat stabilizer materials can include nearly any edible glyceride fat solid. Hydrogenated natural fats such as peanut oil, corn oil, cottonseed oil, linseed oil, palm oil, whale oil, and other marine oils, alone or in combination, are very suitable to provide stabilizers. One preferred type of stabilizer is rapeseed oil having an iodine value not greater than about 10; the use of this stabilizer is described in Sanders U.S. Pat. 3,129,102. Other preferred stabilizers are described in Japikse U.S. Pat. 3,265,507; for example, this patent discloses stabilizer compositions comprising substantially fully hydrogenated soybean oil and substantially fully hydrogenated rapeseed oil in weight ratios ranging from about 2:3 to about 3:2. Still another preferred stabilizer is cottonseed stearin hydrogenated to an iodine value of less than about 12.

The optional materials referred to above can be various flavor-providing materials including salt, sucrose, and honey. For example, the homogeneous mixture formed in the first step described above can additionally comprise by weight from about 1% to about 1.5% salt, from about 1% to about 2% sucrose, and from about 0.5% to about 1.5% honey. It is preferred that when these flavoring components are utilized that they be balanced with an equivalent addition by weight of fats to provide good spread consistency. The solid fat stabilizer materials count toward this equivalent addition by weight of fats. If these flavor agents are utilized in an amount exceeding the above-described stabilizer component, an amount of vegetable oil, for example peanut oil, or slightly hydrogenated soybean oil, is often added in an amount equal to the difference in weight between the weight of these flavor components and the stabilizer components.

The soy flour ingredient is available commercially. It normally contains from about 55% to about 70% by weight protein. It is prepared, for example, by grinding soybean meal to a particle size ordinarily ranging from about 10 microns to about 100 microns. Preferably the resulting ground meal is defatted, for example, by extraction with hexane. More preferably, the defatted ground meal is also extracted with methanol in order to reduce a bitter "beany" flavor normally associated with soy flour previous to this extraction. The soy flour preferred for use herein is a methanol-extracted defatted soy flour. As indicated above, the total amount of peanut paste and soy flour, that is, the combination of these two ingredients, should amount to at least about 63% by weight of the homogeneous mixture of ingredients processed herein to give the final product; this level of peanut paste and soy flour is essential to assure the provision of a final spread with a protein nutritional value at least equivalent to that of conventional peanut butter.

The liquid vegetable oil ingredient is ordinarily utilized in a weight ratio with the soybean flour ranging from about 1.25:1 to about 1.75:1. The use of oil and soy flour in these ratios provides an ultimate product of good consistency, that is, consistency equivalent to that of conventional peanut butter. The liquid vegetable oil can be a non-hydrogenated oil, a hydrogenated oil, or a combination of the two. Preferably for reasons of health, an oil having a high level of polyunsaturated acid moieties (for example, more than about 40% by weight of its acid moieties expressed as acids), is utilized. Oils containing high levels of linolenic acid, for example, oils having acid moieties expressed as acids containing more than about 3% by weight of linolenic acid moieties expressed as acids, ordinarily are selectively hydrogenated by conventional methods to reduce the level of linolenic acids to less than about the 3% level; this is because oils wherein this level of linolenic acid moieties is exceeded can be subject to rancidity. Partially hydrogenated oils can be winterized to assure continued liquidity. Suitable liquid oils without high levels of polyunsaturated acids are derived from coconut oil, olive oil, palm oil, palm kernel oil, peanut oil, and rapeseed oil. Suitable liquid vegetable oils with high levels of polyunsaturated acids are derived from corn oil, cottonseed oil, safflower oil, sesame seed oil, soybean oil, and sunflower seed oil. A very preferred liquid vegetable oil ingredient is partially hydrogenated soybean oil which has been winterized, for example, soybean oil hydrogenated to an iodine value of 107 and thereafter winterized.

The homogeneous mixture of the above-described spread ingredients is conveniently formed by admixing the various ingredients in conventional mixing equipment. The various ingredients can be admixed in any order, for example, the soy flour and liquid vegetable oil ingredient can be admixed with already-prepared peanut butter. Or, the conventional peanut butter ingredients can be individually admixed with the soy flour and liquid vegetable oil ingredient. Preferably the soy flour is first slurried in the liquid vegetable oil ingredient, and this slurry is admixed with the rest of the ingredients.

The formed homogeneous mixture is then heat treated by maintaining it at a temperature ranging from about 300° F. to about 500° F., preferably from about 350° to about 450° F., for a period ranging from about 1 to about 5 minutes, preferably from about 2 minutes to about 4 minutes. This heat treatment can be carried out in any suitable equipment, for example, in a scraped wall heat exchanger, or in a jacketed stainless steel vessel equipped with an agitator and having heated oil circulating through the jacket.

This heat-treating step is essential to provide to the ultimate product a color and flavor similar to that of conventional peanut butter and the combination of time and temperature utilized in this step should be sufficient to achieve this result.

This heat-treated homogeneous mixture is then chilled with agitation to a temperature ranging from about 35° F. to about 85° F. This chilling ordinarily is carried out over a time period ranging from about 10 seconds to about 1 hour, preferably from about 20 seconds to about 5 minutes, more preferably not to exceed 2 minutes. This chilling step is essential to bring to an end the heat-treating step and to provide an ultimate product having the consistency similar to that of conventional peanut butter. Moreover, it provides an ultimate peanut product with good non-stickiness properties, that is, a peanut spread which does not stick to the roof of the mouth and resists to some degree sticking to the peanut butter container.

The resulting peanut spread is now ready for use, or it can be packaged by conventional packaging methods. In a very preferred process the combination of the cooling step and the packaging step should require no longer than about 1.25 minutes of elapsed time, as described in Baker et al. U.S. Pat. 3,127,272.

The peanut spread so formed has a peanut butter-like eating quality, and in particular, a peanut butter-like consistency. It furthermore has a peanut butter-like color and flavor. Morevore, it has a protein nutritional value at least equivalent to that of conventional peanut butter.

The following example further illustrates the peanut spread of the present invention, its characteristics, the methods for preparing this peanut spread, and the benefits derived from this method.

EXAMPLE

A homogeneous mixture of ingredients is prepared comprising the following percentages of ingredients:

| Ingredients: | Percentage by weight |
| --- | --- |
| Peanut paste | 44.7 |
| Methanol-extracted, defatted soy fluor | 19.0 |
| Soybean oil hydrogenated to an iodine value of 107 and winterized | 28.45 |
| Cottonseed stearin hydrogenated to an iodine value of 8 | 3.45 |
| Salt | 1.20 |
| Sucrose | 1.70 |
| Honey | 1.00 |
| Peanut oil | 0.5 |
| | 100.00 |

The soy fluor is analyzed to contain 63% by weight protein. The combination of the peanut paste and soy flour ingredients amounts to 63.7% by weight of the homogeneous mixture. The weight ratio of liquid vegetable oil, that is, winterized hydrogenated soybean oil, to soy fluor is about 1.5:1.

The ingredients are mixed to form a homogeneous mixture as follows. The soy fluor ingredient is slurried in the liquid vegetable oil ingredient by addition of the soy flour to the liquid vegetable oil with stirring in a stainless steel vessel. This slurry is then admixed with the rest of the spread ingredients, that is, with the conventional peanut butter ingredients, in a stainless steel vessel. The mixture is then heat treated; in this operation it is pumped with agitation through a heat exchanger wherein it is maintained at a temperature of 400° F. for 3 minutes until it attains the color and taste of conventional peanut butter. This heat-treated mixture is then rapidly chilled to a temperature of 60° F. in a scraped wall heat exchanger, the residence time in the scraped wall heat exchanger being 0.5 minute. The spread so formed has a consistency, color, and flavor similar to that of conventional peanut butter and a nutritional value better than that of conventional peanut butter.

In another case, peanut spread is made as described above except that a conventional temperature of 150° F. is utilized during the heat treating step instead of the 400° F. temperature utilized above. Even when this temperature is applied for as much as one hour, the heat-treated mixture and the ultimate product is gray and lacks the peanut flavor normally associated with peanut butter.

Peanut spread is made as above except that the liquid vegetable oil ingredient is omitted. The homogeneous mixture has a consistency of fudge and cannot be processed further.

Consistency, color, flavor, and nutritional results similar to that achieved above in the example of this invention are achieved when other solid fat stabilizer materials, for example, rapeseed oil hydrogenated to an iodine value of 8, or a mixture containing 50% by weight of substantially completely hydrogenated soybean oil and 50% by weight of substantially completely hydrogenated rapeseed oil (that is, each hydrogenated to an iodine value of about 8) are substituted for the cottonseed stearn utilized above.

Consistency, color, flavor, and protein nutritional results similar to those achieved in the example of this invention above are achieved when other liquid vegetable oils, for example, peanut oil or cottonseed oil, are substituted for the soybean oil utilized in the above example.

What is claimed is:

1. A process for preparing a vegetable protein-supplemented peanut spread having the color and flavor of conventional peanut butter, said process consisting essentially of the steps of
   (a) forming a homogeneous mixture by admixing spread ingredients consisting essentially of by weight from about 40% to about 50% by weight peanut paste, from about 0.5% to about 5% solid fat stabilizer materials, from about 15% to about 25% soy flour, and from about 25% to about 35% liquid vegetable oil, the total of peanut paste and soy flour amounting to at least 63% by weight of the ingredients;
   (b) heat treating the homogeneous mixture by maintaining it at a temperature ranging from about 350° F. to about 500° F. for a period ranging from about 1 minute to about 5 minutes; and
   (c) chilling the heat-treated mixture with agitation to a temperature ranging from about 35° F. to about 85° F. over a time period ranging from about 10 seconds to about 1 hour.

2. The process of claim 1 wherein the spread ingredients comprise by weight from about 42% to about 48% peanut paste, from about 1% to about 4% solid fat stabilizer materials, from about 17% to about 22% soy flour, and from about 27% to about 32% liquid vegetable oil.

3. The process of claim 2 wherein the soy flour is methanol-extracted defatted soy flour and the liquid vegetable oil is an oil having a high level of polyunsaturated acid moieties.

4. The process of claim 3 wherein the liquid vegetable oil is soybean oil hydrogenated to an iodine value of 107 and winterized.

5. The process of claim 4 wherein in the heat-treating step the homogeneous mixture is maintained at a temperature ranging from about 350° F. to about 450° F. for a period ranging from about 2 minutes to about 4 minutes and wherein the heat-treated mixture is chilled over a time period ranging from about 20 seconds to about 5 minutes.

6. The process of claim 5 wherein the chilling time does not exceed 2 minutes.

7. The process of claim 6 wherein the spread ingredients additionally comprise by weight from about 1% to about 1.5% salt, from about 1% to about 2% sucrose, and from about 0.5% to about 1.5% honey.

References Cited
UNITED STATES PATENTS

| | | | |
|---|---|---|---|
| 3,216,830 | 11/1965 | Melnick | 99—128 |
| 3,246,991 | 4/1966 | Auera | 99—128 |
| 3,346,390 | 10/1967 | Picnel | 99—128X |

FRANK W. LUTTER, Primary Examiner

R. HALPER, Assistant Examiner

U.S. Cl. X.R.

99—144